(12) United States Patent
Xiao et al.

(10) Patent No.: US 8,424,060 B2
(45) Date of Patent: Apr. 16, 2013

(54) TRUSTED NETWORK ACCESS CONTROLLING METHOD BASED ON TRI-ELEMENT PEER AUTHENTICATION

(75) Inventors: Yuelei Xiao, Xi'an (CN); Jun Cao, Xi'an (CN); Xiaolong Lai, Xi'an (CN); Zhenhai Huang, Xi'an (CN)

(73) Assignee: China Iwncomm Co., Ltd., Xi'an (CN)

( * ) Notice: Subject to any disclaimer, the term of this patent is extended or adjusted under 35 U.S.C. 154(b) by 276 days.

(21) Appl. No.: 12/742,618

(22) PCT Filed: Nov. 14, 2008

(86) PCT No.: PCT/CN2008/073059
§ 371 (c)(1),
(2), (4) Date: May 12, 2010

(87) PCT Pub. No.: WO2009/065345
PCT Pub. Date: May 28, 2009

(65) Prior Publication Data
US 2010/0263023 A1    Oct. 14, 2010

(30) Foreign Application Priority Data
Nov. 16, 2007    (CN) .......................... 2007 1 0019093

(51) Int. Cl.
*H04L 29/06*    (2006.01)
(52) U.S. Cl.
USPC ................. 726/3; 713/168; 713/155; 726/15; 709/229
(58) Field of Classification Search ........................ None
See application file for complete search history.

(56) References Cited

U.S. PATENT DOCUMENTS 7,376,081 B2 *  5/2008  Towle ........................... 370/230

7,592,906 B1 *  9/2009  Hanna et al. .................. 340/506

(Continued)

FOREIGN PATENT DOCUMENTS

| CN | 1960286 A | 5/2007 |
|---|---|---|
| CN | 1976337 A | 6/2007 |

(Continued)

OTHER PUBLICATIONS

TCG Trust Network connect TNC arctecture of interoperablity. specefication version 1.1 Revision 2 , May 1, 2006.*

(Continued)

*Primary Examiner* — Fikremariam A Yalew
(74) *Attorney, Agent, or Firm* — Harness, Dickey & Pierce, P.L.C.

(57) ABSTRACT

A trusted network access controlling method based upon tri-element peer authentication comprises: Firstly initializing creditability collectors and a creditability verifier; then carrying out a tri-element peer authentication protocol among a network access requester, a network access controller and an authentication strategy server in a network access control layer to realize bi-directional user authentication between the access requester and the access controller; When authentication is successful or the locale strategy requires to carry out a when a platform creditability evaluation process, the TNC terminal, TNC server and evaluation strategy server in a trusted platform evaluation layer performing the tri-element peer authentication protocol to realize bi-directional platform creditability authentication between the access requester and the access controller; Finally the access requester and the access controller controlling ports according to the recommendation generated by the TNAC client terminal and the TNAC service terminal. The invention solves the technical problem about poor expandability in background, and further solves the problem about complex key negotiation and relatively low safety.

13 Claims, 2 Drawing Sheets

U.S. PATENT DOCUMENTS

| | | | |
|---|---|---|---|
| 8,191,113 B2* | 5/2012 | Xiao et al. ................. 726/3 |
| 2003/0028763 A1 | 2/2003 | Malinen et al. |
| 2006/0221828 A1 | 10/2006 | Towle |
| 2006/0256763 A1 | 11/2006 | Nguyen et al. |
| 2007/0016939 A1 | 1/2007 | Leibovitz et al. |
| 2010/0263023 A1 | 10/2010 | Xiao et al. |

FOREIGN PATENT DOCUMENTS

| | | |
|---|---|---|
| CN | 1976338 A | 6/2007 |
| CN | 1997026 A | 7/2007 |
| CN | 101136928 A | 3/2008 |
| CN | 101159640 A | 4/2008 |
| CN | 101159660 A | 4/2008 |
| CN | 101242266 A | 8/2008 |
| CN | 101242267 A | 8/2008 |
| CN | 101242268 A | 8/2008 |
| CN | 101242401 A | 8/2008 |
| EP | 1182557 A2 | 2/2002 |
| EP | 1858195 A1 | 11/2007 |
| EP | 2180632 A1 | 4/2010 |
| EP | 2184886 A1 | 5/2010 |
| JP | 2005182509 A | 7/2005 |
| JP | 2008530698 A | 8/2008 |
| JP | 2010534988 A | 11/2010 |
| RU | 2190310 C2 | 9/2002 |
| WO | WO-2006086931 A1 | 8/2006 |
| WO | WO-2007117939 A1 | 10/2007 |
| WO | WO-2008100264 A2 | 8/2008 |

OTHER PUBLICATIONS

Russian Decision on Grant regarding Application No. 2010123909/08(034121), dated Sep. 6, 2011. Translation provided by Unitalen Attorneys at Law.

Extended European Search Report regarding Application No. 08851105.0-2413/ 2211570, dated Nov. 22, 2011.

TCG Trusted Network Connect TNC Architecture for Interoperability. Specification Version 1.1. Revision 2. May 1, 2006.

Science in China. Part E: Information Science. 2007. vol. 37, No. 2, pp. 129-150. A Summary of Information Security. Abstract provided by Unitalen Attorneys at Law.

TCG: "TCG Trusted Network Connect TNC Architecture for Interoperability", Specification Version 1.2 Revision 4, May 21, 2007 Published, pp. 11-24.

He, Xinquan "New Network Connect Technology", Netinfo security, Mar. 2007, No. 3, pp. 71-73.

Zhang, Tao "Application of Trusted Network Connect (TNC) Architecture", Computer knowledge and Technology, 2005, No. 32 (2005), pp. 24-25.

Shane Balfe et al. "Trusted Computing: Providing Security for Peer-to-Peer Networks." Proceedings of the Fifith IEEE International Conference on Peer-to-Peer Computing. Aug. 31-Sep. 2, 2005.

Xiao-Yong Li et al. "An Efficient Attestation for Trustworthiness of Computing Platform." Proceedings of the 2006 International Conference on Intelligent Information Hiding and Multimedia Signal Processing. Dec. 2006.

Sachiko Yoshihama. "Platform Trust Based Access Control Framework." The 2006 Symposium on Cryptography and Information Security. Hiroshima, Japan. Jan. 17-20, 2006. The Institute of Electronics, Information and Communication Engineers.

IEEE Standards 802.1X. IEEE Standard for Local and metropolitan area networks. Port-Based Network Access Control. IEEE Computer Society. Sponsored by the LAN/MAN Standards Committee. Dec. 13, 2004.

* cited by examiner

TRUSTED NETWORK ACCESS CONTROLLING METHOD BASED ON TRI-ELEMENT PEER AUTHENTICATION

This application claims priority to Chinese Patent Application No. 200710019093.2, entitled "A trusted network access control method based on tri-element peer authentication", filed with the Chinese Patent Office on Nov. 16, 2007, which is hereby incorporated by reference in its entirety.

FIELD OF THE INVENTION

The present invention relates to the field of network security and in particular to a method for trusted network access control based upon tri-element peer authentication.

BACKGROUND OF THE INVENTION

The issue of malicious software, e.g., viruses, worms, etc., has become highly prominent along with the informatization development. There have been more than thirty-five thousand kinds of malicious software at present, and more than forty million computers have been infected annually. It is required for inhibition of such attacks to not only address secured transport and a check for data input but also defend from the origin, i.e., each terminal connected to a network. However, traditional security defending approaches have failed to defend against numerous malicious attacks.

The international Trusted Computing Group (TCG) has established specifically for this issue a trusted computing based network connection specification—Trusted Network Connect (TNC)—simply TCG-TNC, which includes an open terminal integrity architecture and a set of standards for guaranteeing secure interoperations. This set of standards can protect a network as demanded for a user to a protection extent self-defined by the user. The TCG-TNC is essentially intended to establish a connection starting with integrity of a terminal. It is required in the TCG-TNC architecture to create a set of policies for the operation condition of a system in the trusted network, so that only if a terminal complying with a policy which is set for the network can access the network, the network can isolate and locate those devices that do not comply with the policy. An attack of root kits can also be blocked due to a Trusted Platform Module (TPM) in use. The root kits are a kind of attack script, a modified system program or a set of attack scripts and kits, which is intended in a target system to acquire illegally a highest control privilege of the system.

Figure 1:
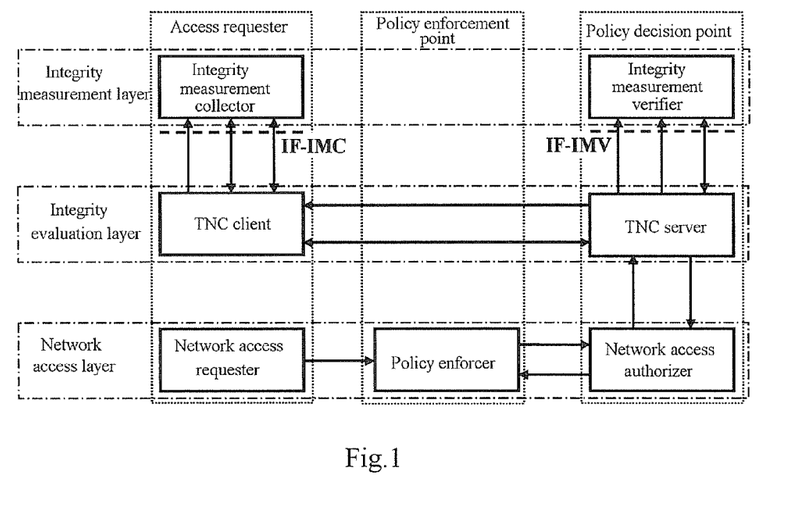
FIG. 1 is a schematic diagram of complete information transmission for trusted network access control in an existing TCG-TNC architecture.

In the existing TCG-TNC architecture, complete information transmission on a trusted network connect is as illustrated in FIG. 1. A TNC client shall prepare and submit required platform integrity information to an Integrity Measurement Collector (IMC) prior to establishment of a network connection. In a terminal provided with a Trusted Platform Module (TPM), the foregoing process also means that platform information required for a network policy is hashed and then stored in respective Platform Configuration Registers (PCRs) and a TNC server shall pre-establish and submit a platform integrity verification request to an Integrity Measurement Verifier IMV. A specific process of this method is as follows:

(1) A network access requestor initiates an access request to a policy enforcer.
(2) The policy enforcer transmits a description of the access request to a network access authorizer.
(3) The network access authorizer executes a user authentication protocol with the network access requester upon reception of the description of the access request from the network access requester. The network access authorizer transmits the access request and user authentication success information to a TNC server upon successful user authentication.
(4) The TNC server commences executing bidirectional platform credential authentication with a TNC client, e.g., verifying an Attestation Identity Key (AIK) of a platform, upon reception of both the access request and the user authentication success information transmitted from the network access authorizer.
(5) The TNC client notifies an Integrity Measurement Collector (IMC) about both commencement of a new network connection and a need to execute an integrity handshake protocol upon successful platform credential authentication. The Integrity Measurement Collector (IMC) returns required platform integrity information via an Integrity Measurement Collector Interface IF-IMC. The TNC server submits the platform integrity information to an Integrity Measurement Verifier (IMV) via an Integrity Measurement Verifier Interface IF-IMV.
(6) The TNC client and the TNC server perform one or more exchanges of data during execution of the integrity handshake protocol until the TNC server does not need any more.
(7) The TNC server completes execution of the integrity handshake protocol on the TNC client and transmits a recommendation to the network access authorizer to request for an access to be permitted. As can be appreciated, if there is an additional security consideration, the policy decision point still may not permit any access of the Access Requester.
(8) The network access authorizer passes an access decision to the policy enforcer, and the policy enforcer finally executes the decision to control the access of the access requester.

No matured TCG-TNC architecture product has been put into the market at present. Some important techniques of the TCG-TNC architecture are still in a phase of research and standardization. As can be seen in the method of the prior art, since a predefined secure channel is present between the policy enforcement point and the policy decision point, and the policy decision point possibly manages a large number of policy enforcement points, the policy decision point has to configure a large number of secure channels, thereby causing complicated management and consequential poor expansibility. Moreover, data over a network access layer has to be protected for security, so a secure channel has to be established between the access requester and the policy decision point, that is, session key negotiation has to be performed. However, data protection is also required between the access requester and the policy enforcement point, so session key negotiation has to be performed again between the Access Requester AR and the policy execution point, thus complicating the key negotiation process. Also a primary key resulting from the negotiation between the access requester and the policy decision point is passed from the policy decision point to the policy enforcement point. Passing of the key over the network may introduce a new security attack point to result in lowered security. Moreover, the dual session key negotiation makes use of the same primary key, which may also lower security throughout the trusted network connect architecture. Furthermore, the access requester may be unable to verify an AIK certificate of the policy decision point for validity. During the platform credential authentication process, the access requester and the policy decision point use AIK private keys and certificates for the bidirectional platform credential authentication and both of them shall verify the AIK certificates for validity. If the policy decision point is a network access service provider of the access requester, the access requester can not access any network without a trusted network connect, that is, the AIK certificate of the policy decision point can not be verified for validity, which would be insecure. Finally, platform integrity evaluation is not peer-to-peer. In the TCG-TNC architecture, the policy decision point performs platform integrity evaluation on the access requester, and the policy enforcement point can know from an enforcement decision of the policy decision point whether a platform of the access requester is trusted, but the access requester will not perform platform integrity evaluation on the policy decision point. If the platform of the policy decision point is un-trusted, e.g., due to malicious software, etc., it may be insecure for the access network to be connected with a un-trusted device, and a trustworthiness link from the access requester to the trusted network may be broken at the policy enforcement point, but a peer-to-peer trust is necessary in an Ad Hoc network.

SUMMARY OF THE INVENTION

An object of the invention is to provide a method for trusted network access control based upon Tri-element Peer Authentication (TePA), which can address the technical problems of a trusted network connect in the prior art including poor expansibility, a complex key negotiation process, low security, the access requester failing to verify an AIK certificate for validity and platform trustworthiness evaluation being not peer-to-peer.

Technical Solutions of the Invention are as Follows

A method for trusted network access control based upon tri-element peer authentication includes the steps of:
  Initializing, by an access requester and an access controller, Trustworthiness Measurement Collectors, TMCs, at a trustworthiness measurement layer to collect trustworthiness information required for each other; and initializing, by a policy manger, a Trustworthiness Measurement Verifier, TMV, at the trustworthiness measurement layer to verify trustworthiness information of the access requester and the access controller;
  executing a tri-element peer authentication protocol based on a policy manager acting as a third party by the access requester, the access controller and the policy manager at a network access control layer to perform bidirectional user authentication between the access requester and the access controller;
  when results of user authentication indicate successful authentication or that a platform trustworthiness evaluation process is required in a local policy, executing the tri-element peer authentication protocol based on the policy manager acting as a third party by the access requester, the access controller and the policy manager at a trusted platform evaluation layer to perform bidirectional platform trustworthiness evaluation between the access requester and the access controller; generating by a TNAC client of the access requester and a TNAC server of the access controller according to results of platform trustworthiness evaluation in the platform trustworthiness evaluation process and transmitting corresponding recommendations respectively to the access requester and the access controller so that the network access requester and the network access controller control mutual access ports respectively according to the recommendations.

Particularly, the Port Control is Performed as Follows:
  an uncontrolled port of the access requester controls transport of user authentication and session key negotiation protocols data, a platform trustworthiness evaluation protocol data and platform remediation service data, and a controlled port of the access requester controls transport of application service data; and
  an uncontrolled port of the access controller controls transport of the user authentication and session key negotiation protocols data, and a controlled port of the access controller controls transport of the platform trustworthiness evaluation protocol data, platform remediation service data and application service data.

Particularly, the Port Control is Performed as Follows:
  (a) an access requester entity in the access requester and a user authentication entity in the access controller perform bidirectional user authentication and session key negotiation via the uncontrolled ports, and the user authentication entity in the access controller and an authentication service policy entity in the policy manager exchange information directly; and upon successful bidirectional user authentication, the controlled port of the access controller is changed to an authenticated state to allow transport the platform trustworthiness evaluation protocol data; and
  (b) The access requester entity in the access requester, a platform trustworthiness evaluation entity in the access controller and an evaluation policy service entity in the policy manager execute the tri-element peer authentication protocol to perform bidirectional platform trustworthiness evaluation between the access requester and the access controller; and in the platform trustworthiness evaluation process, the access requester entity in the access requester communicates via the uncontrolled port, the platform trustworthiness evaluation entity in the access controller communicates via the authenticated controlled port, and the platform trustworthiness evaluation entity in the access controller and the evaluation policy service entity in the policy manager exchange information directly.

Particularly, Port Control of the Access Requester and the Access Controller is Performed as Following Four Cases after the Platform Trustworthiness Evaluation Process is Performed:
  if both platforms of the access requester and the access controller are trusted, both the controlled ports in the access requester and the access controller are in a trusted state so that transport of application service data is allowed between the access requester and the access controller.
  Or if the platform of the access requester is trusted and the platform of the access controller is un-trusted, the uncontrolled and controlled ports of the access requester and the access controller are in an original state, and the access controller retrieves remediation information of platform configuration from a connected isolated domain for platform remediation. The access controller is connected with both the isolated domain and a secure domain.
  Or if the platform of the access requester is un-trusted and the platform of the access controller is trusted, the controlled port for which remediation is disabled of the access controller is changed to a state in which remediation has been enabled so that the access requester can access an isolated domain via the access controller to retrieve remediation information of platform configuration for platform remediation.
  Or if neither of the platforms of the access requester and the access controller is trusted, the controlled port for which remediation is disabled of the access controller is changed to a state in which remediation has been enabled so that the access requester can access an isolated domain via the access controller to retrieve remediation information of platform configuration for platform remediation.

Particularly, the recommendations include access permission information, access prohibition information or isolation and remediation information.

Particularly, when the recommendations received by the network access controller and the network access requester are isolation and remediation information, the access requester and the access controller make platform remediation through remediation information of platform configuration and perform the platform trustworthiness evaluation process between the access requester and the access controller.

Particularly, Platform Trustworthiness Evaluation is Performed as Follows:

platform credential authentication is performed: the policy manager verifies AIK certificates of the access requester and the access controller for validity; and platform trustworthiness verification is performed: the policy manager verifies platform trustworthiness of the access requester and the access controller.

Particularly, the Platform Trustworthiness Evaluation Process Between the Access Requester and the Access Controller Includes:

transmitting information identifying the platform configuration of the access requester between the access requester and the policy manager and information identifying the platform configuration of the access controller between the access controller and the policy manager through encrypted transmission;

transmitting exchanged information between the TNAC client and the TNAC server using a session key; and generating and transmitting, by the policy manager, the results of platform trustworthiness evaluation of the access requester and the access controller to the TNAC client and the TNAC server.

Particularly, a User Authentication Process Between the Access Requester and the Access Controller Includes:

initiating an access request from the access requester to the access controller;

initiating by the access controller the user authentication process upon reception of the access request and generating results of user authentication of the access requester and the access controller;

generating by the access requester and the access controller a primary key there between them upon successful user authentication; and negotiating by the access requester and the access controller about a session key using the primary key and transmitting user authentication success information respectively to the TNAC client and the TNAC server.

Particularly, Initializing the Trustworthiness Measurement Collectors, TMCs, and the Trustworthiness Measurement Verifier, TMV, at the Trustworthiness Measurement Layer Includes:

initializing, by the TNAC client of the access requester and the TNAC server of the access controller, the Trustworthiness Measurement Collectors, TMCs, at the trustworthiness measurement layer;

initializing, by an Evaluation Policy Server, EPS, of the policy manager, the Trustworthiness Measurement Verifier, TMV, at the trustworthiness measurement layer;

storing, by Trusted Platform Modules, TPMs, of the access requester and the access controller, the trustworthiness information required for each other into Platform Configuration Registers, PCRs;

preparing, by the TNAC client of the access requester and the TNAC server of the access controller, platform trustworthiness information required for the access controller and the access requester respectively through the Trustworthiness Measurement Collectors, TMCs; and establishing and distributing, by the policy manager, access control policies including a policy of the access requester for joining a connected network and a network access control policy of the access controller for the access requester.

The Invention has the Following Advantages Over the Prior Art

With the method according to the invention, a description of platform trustworthiness can be expanded and trustworthiness can be defined as a platform state attribute measuring and evaluating platform trustworthiness, e.g., integrity, to thereby enhance expansibility of trusted network access control. In a practical application, a policy manager has to manage a large number of access controllers, and the invention can eliminate a need of strong security association between the access controller and the policy manager, thus enhancing extendibility of trusted network access control. Moreover, the invention can further simplify a key negotiation process and improve security of trusted network access control. Key negotiation can be performed between the access requester and the access controller to secure directly data of a platform trustworthiness evaluation process and service data after trusted network access control without dual session key negotiation to thereby simplify a key negotiation process and improve security of trusted network access control. Security of a key can be guaranteed because it is unnecessary to transmit a primary key generated in an authentication process over a network to thereby guarantee security of the key. The invention can further enhance security of the platform trustworthiness evaluation process and simplify a key management and trustworthiness verification mechanism of trusted network access control. Since according to the invention a tri-element peer authentication method is adopted at the trusted platform evaluation layer, that is, centralized authentication and verification of AIK certificates and platform trustworthiness of the access requester and the access controller are performed respectively in a third-party based bidirectional authentication method to thereby enhance security of the platform trustworthiness evaluation process and simplify the key management and trustworthiness verification mechanism of a trusted network access control architecture. Moreover, the invention can improve security of overall trusted network access control. The invention adopts the tri-element peer authentication method for both bidirectional user authentication at the network access control layer and bidirectional platform trustworthiness evaluation at the trusted platform evaluation layer. Thus, the invention improves security of the overall trusted network access control architecture.

Then, the invention can further eliminate the problem that a trust chain may be broken at an access device. Since bidirectional platform trustworthiness evaluation is performed between the access requester and the access controller, the invention eliminates the problem of a trust chain being broken at the access controller of an access device.

Lastly, the method according to the invention adopts multilevel port control. The access controller performs multilevel control on a controlled port to thereby control strictly an access privilege of the access requester and improve security and performance of the trusted network access control architecture. The invention expands a description of a trusted platform module. In the TCG-TNC architecture, a Trusted Platform Module (TPM) is a security chip on a main board. According to the invention, the Trusted Platform Module (TPM) can be an abstract software module responsible for trusted platform evaluation. For example, a Trusted Platform Module (TPM) implemented in software scans respective components of the platform and then generates and transmits security scan results to an opposite platform. The opposite platform then evaluates these security scan results to thereby perform trusted platform evaluation.

REFERENCE NUMERALS ARE LISTED BELOW $N_S$: a random number generated by an access controller; $Cert_{AC\text{-}AIK}$: an AIK certificate of an access controller; $PCRsList_{AR}$: a PCRs parameters list requested by the access controller from the access requester; $N_{AR}$: a random number generated by the access requester; $Cert_{AR\text{-}AIK}$: an AIK certificate of the access requester; $PCRsList_{AC}$: a PCRs parameters list requested by the access requester requests from the access controller; $Log_{AR}$: a measurement log corresponding to values of PCRs requested by the access controller; $PCRs_{AR}$: the values of PCRs requested by the access controller; $[N_S, PCRs_{AR}]_{Sig}$: a signature of the access requester on the random number generated by the access controller $N_S$ and on the corresponding values of PCRs requested by the access controller; $N_{AC}$: a random number generated by a user of the access controller; $Log_{AC}$: a measurement log corresponding to values of PCRs requested by the access requester; $PCRs_{AC}$: the values of PCRs requested by the access requester; $[N_{AR}, PCRs_{AC}]_{Sig}$: a signature of the access controller on the random number generated by the access requester $N_{AR}$ and on the corresponding values of PCRs requested by the access requester; $Result_{AIK\text{-}PCRs}$: results of AIK certificate authentication and trustworthiness verification of the access requester and the access controller; $[Result_{AIK\text{-}PCRs}]_{Sig}$: a signature of a policy manager on the results of AIK certificate authentication and trustworthiness verification of the access requester and the access controller; $Re_{AC}$: the result of platform trustworthiness verification of the access controller; $Re_{AR}$: the result of platform trustworthiness verification of the access requester; $Re_{AR\text{-}AIK}$: the result of AIK certificate verification of the access requester; $Re_{AC\text{-}AIK}$: the result of AIK certificate verification of the access controller; $Re_{Access}$: a result of trusted access; $Rem_{AR}$: remediation information of platform configuration of the access requester; and $Rem_{AC}$: remediation information of platform configuration of the access controller.

DETAILED DESCRIPTION OF THE INVENTION

The invention relates to a network connection based upon trusted computing technique and a method for Trusted Network Access Control (TNAC) based upon Tri-element Peer Authentication (TePA), which has been proposed primarily for the drawbacks of the TNC architecture in the existing TCG system.

The invention primarily consists of a network access control layer, a trusted platform evaluation layer and a trustworthiness measurement layer. An access requester, an access controller and a policy manager, which are three logic entities of the invention, can be distributed anywhere over a network. The access requester is also referred to as a requester, a user station, etc., the access controller is also referred to as an authentication access controller, a base station, an access service unit, etc., and the policy manager is also referred to as an authentication server, a trusted server, a background server, etc.

The network access control layer is responsible for directional user authentication and key negotiation between the access requester and the access controller as well as mutual access control of the access requester and the access controller according to a result of network user authentication and a result of platform trustworthiness evaluation. The network access control layer can adopt a method for access control based tri-element peer authentication, i.e., network access control technique already adopted in the Chinese WLAN standard. Trustworthiness in the invention refers to a platform state attribute measuring and evaluating trustworthiness of a platform, e.g., integrity.

A Trusted Platform Module (TPM) in the invention may be a Trusted Platform Module (TPM) of a TNC architecture in a TCG system or an abstract software module responsible for trusted platform evaluation. For example, a Trusted Platform Module (TPM) implemented in software scans respective components of the platform and then generates and transmits security scan results to an opposite platform. The opposite platform then evaluates these security scan results to thereby perform trusted platform evaluation.

The trusted platform evaluation layer is responsible for platform trustworthiness evaluation including platform credential authentication and platform trustworthiness verification between the access requester and the access controller. A protocol of tri-element peer authentication, i.e., third-party based bidirectional authentication protocol, is executed at the trusted platform evaluation layer between the access requester, the access controller and the policy manager, and the policy manager verifies AIK certificates of the access requester and the access controller for validity and is responsible for verifying platform trustworthiness of the access requester and the access controller.

The trustworthiness measurement layer is responsible for collecting and verifying platform trustworthiness related information of the access requester and the access controller.

Figure 3:
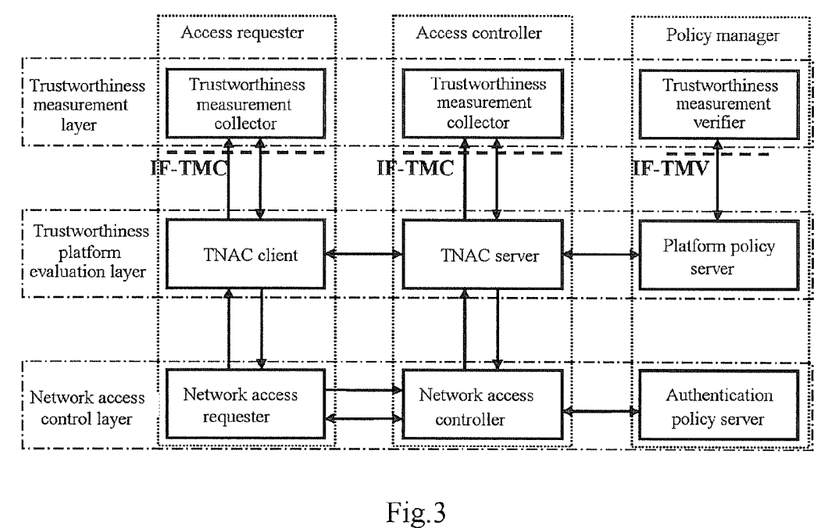
FIG. 3 is a schematic diagram of complete information transmission for trusted network access control in a TNAC architecture according to the invention.

FIG. 3 illustrates a structural interaction diagram of a process of complete information transmission for trusted network access control according to the invention. Specific steps of implementing the invention are as follows:

(1.) Initialization is performed. Trustworthiness Measurement Collectors (TMC) and a Trustworthiness Measurement Verifier (TMV) at the trustworthiness measurement layer are initialized prior to establishment of a trusted network connect;

Particularly, the initialization can include the following steps:

(1.1) A TNAC client of the access requester and a TNAC server of the access controller initialize the Trustworthiness Measurement Collectors (TMCs) at the trustworthiness measurement layer to collect trustworthiness information required for each other. An Evaluation Policy Server (EPS) of the policy manager initializes the Trustworthiness Measurement Verifier (TMV) at the trustworthiness measurement layer to verify platform trustworthiness of the access requester and the access controller.

(1.2) Trusted Platform Modules (TPMs) of the access requester and the access controller store the trustworthiness information required for each other into Platform Configuration Registers (PCRs). The trustworthiness information relating to integrity shall be hashed and stored into the Platform Configuration Registers (PCRs).

(1.3) The TNAC client of the access requester and the TNAC server of the access controller prepare platform trustworthiness information required for the access controller and the access requester respectively through the Trustworthiness Measurement Collectors (TMCs).

(1.4) The policy manager establishes and distributes network access control policies including a policy of whether the access requester joins a connected network and a network access control policy of the access controller for the access requester. The policy manager can establish and distribute the network access control policies of the access requester and the access controller according to the national specification of information security multilevel protection.

(1.5) The TNAC client and the TNAC server prepare PCRs parameter lists which are requested by the access requester and the access controller respectively for verification of each other according to the network access control policies distributed by the policy manager (2.) The access requester, the access controller and the policy manager execute a tri-element peer authentication protocol based on the policy manager acting as a third party at the network access control layer to perform bidirectional user authentication between the access requester and the access controller.

Particularly, the step (2) can include the following steps:

(2.1) The access requester initiates an access request to the access controller.

(2.2) Upon reception of the access request, the access controller initiates a user authentication process and the network access requester, the network access controller and the authentication policy server at the network access control layer begin to execute the tri-element peer authentication protocol, i.e., third-party based bidirectional authentication protocol, where the authentication policy server acts as a third party, to thereby perform bidirectional user authentication between the access requester and the access controller and generate results of user authentication between the access requester and the access controller. If the bidirectional user authentication is successful, the access requester and the access controller generate a primary key therebetween during the user authentication.

(2.3) Upon successful bidirectional user authentication, the access requester and the access controller negotiate about a session key using the primary key generated during the user authentication and then transmit user authentication success information respectively to the TNAC client and the TNAC server and have ports of the network access requester and the network access controller controlled respectively according to the results of user authentication of the access controller and the access requester to thereby enable data of an trustworthiness evaluation process to be passed.

(3.) When the results of bidirectional user authentication indicate successful authentication or that a platform trustworthiness evaluation process is required in a local policy, the access requester, the access controller and the policy manager execute the tri-element peer authentication protocol based on the policy manager acting as a third party at the trusted platform evaluation layer to perform bidirectional platform trustworthiness evaluation between the access requester and the access controller.

Particularly, the step (3) can be performed in the following process:

When the TNAC server of the access controller receives the user authentication success information transmitted from the network access controller or information of the platform trustworthiness evaluation process required in the local policy, the TNAC client, the TNAC server and an evaluation policy server at the trusted platform evaluation layer perform bidirectional platform trustworthiness evaluation of the access requester and the access controller using the tri-element peer authentication protocol. In the platform trustworthiness evaluation process, information exchanged between the TNAC client is transmitted under the protection of the session key negotiated in the step (2.3).

In the trustworthiness evaluation process, information identifying platform configuration of the access requester shall be transmitted between the access requester and the policy manager, e.g., a measurement log corresponding to values of the Platform Configuration Registers (PCRs), remediation information of the platform configuration, etc., which shall be transmitted while being encrypted to thereby prevent the access controller or an attacker from knowing the information. Also information identifying platform configuration of the access controller shall be transmitted between the access controller and the policy manager while being encrypted to thereby prevent the access requester or an attacker from knowing the information. Encrypted transmission techniques that can be adopted here can include symmetric and asymmetric key encryption. In the platform trustworthiness evaluation process, the evaluation policy server plays the role of a third parity, and the TNAC server, the TNAC client and the evaluation policy server also exchange information with trustworthiness measurement collectors and trustworthiness measurement verifier at the upper layer.

Figure 4:
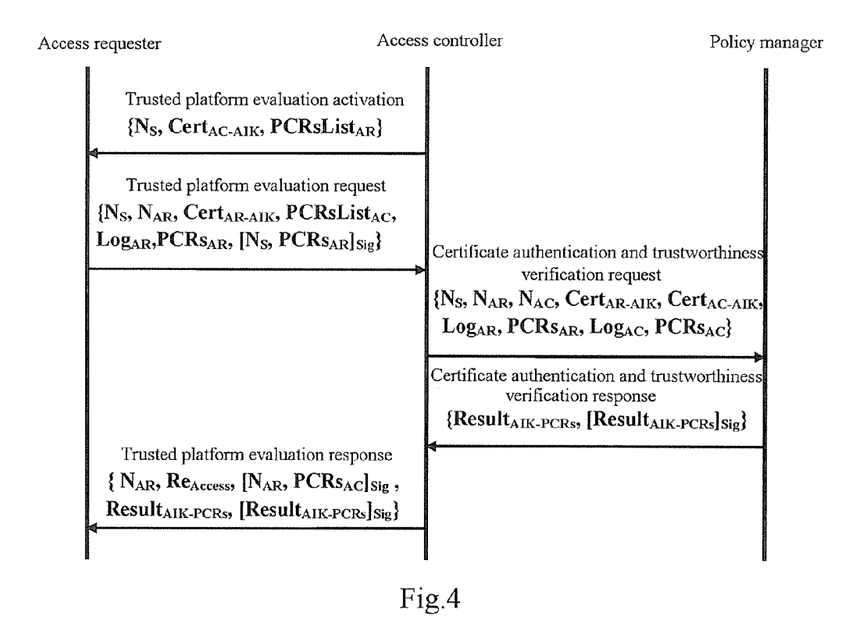
FIG. 4 is a schematic diagram of a platform trustworthiness evaluation process in the TNAC architecture according to the invention.

Particularly in a practical application, the platform testiness evaluation is performed as follows:

① Platform credential authentication is performed: the policy manager verifies AIK certificates of the access requester and the access controller for validity; and ② Platform trustworthiness verification is performed: the policy manager verifies platform trustworthiness of the access requester and the access controller.

Referring to FIG. 3, a specific implementation of platform trustworthiness evaluation according to the invention can be as follows:

(3.1) When the TNAC server of the access controller receives the user authentication success information transmitted from the network access controller or has confirmed successful user authentication, the access controller transmits a random number generated by the access controller $N_S$, an AIK certificate of the access controller $Cert_{AC-AIK}$, and a PCRs parameters list requested by the access controller from the access requester, $PCRsList_{AR}$, to the access requester.

(3.2) Upon reception of the information transmitted from the access controller in the step (3.1.1), the access requester firstly extracts corresponding values of PCRs $PCRs_{AR}$, to the Trusted Platform Module (TPM) from the PCRs parameters list requested by the access controller, and then signs with an AIK private key the values of PCRs $PCRs_{AR}$, extracted to the Trusted Platform Module (TPM) and the random number generated by the access controller $N_S$ in the Trusted Platform Module (TPM). Finally, the access requester transmits to the access controller the random number generated by the access controller $N_S$, a random number generated by the access requester $N_{AR}$, an AIK certificate of the access requester $Cert_{AR-AIK}$, a PCRs parameter list requested by the access requester from the access controller $PCRsList_{AC}$, the values of PCRs requested by the access controller $PCRs_{AR}$, a measurement log corresponding to the values of PCRs requested by the access controller $Log_{AR}$, and a signature of the access requester with the AIK private key in the Trusted Platform Module (TPM) on the values of PCRs, $PCRs_{AR}$, extracted to the Trusted Platform Module (TPM) and the random number generated by the access controller $N_S$, $[N_S, PCRs_{AR}]_{Sig}$.

(3.3) Upon reception of the information transmitted from the access requester in the step (3.2), the access controller firstly verifies the random number generated by the access controller $N_S$ for consistency and verifies the AIK signature $[N_S, PCRs_{AR}]_{Sig}$ of the access requester with a public key in the AIK certificate of the access requester for validity, and next extracts corresponding values of PCRs $PCRs_{AC}$, to the Trusted Platform Module (TPM) from the PCRs parameters list requested by the access requester. Then, the access controller signs with an AIK private key the values of PCRs $PCRs_{AC}$, extracted to the Trusted Platform Module (TPM) and the random number $N_{AR}$ generated by the access requester in the Trusted Platform Module (TPM). Finally, the access controller transmits to the policy manager the random number $N_S$ and a random number $N_{AC}$ generated by the access controller, the random number generated by the access requester $N_{AR}$, the AIK certificate of the access requester $Cert_{AR-AIK}$, the values of PCRs requested by the access controller $PCRs_{AR}$, the measurement log corresponding to the values of PCRs requested by the access controller $Log_{AR}$, the AIK certificate of the access controller $Cert_{AC-AIK}$, the values of PCRs requested by the access requester $PCRs_{AC}$, and a measurement log corresponding to the values of PCRs requested by the access requester $Log_{AC}$.

(3.4) Upon reception of the information transmitted from the access controller in the step (3.3), the policy manager firstly verifies the AIK certificates of the access requester and the access controller for validity; then recalculates corresponding values of PCRs according to the measurement logs $Log_{AR}$ and $Log_{AC}$ of the corresponding values of PCRs extracted to the respective Trusted Platform Modules (TPMs) of the access requester and the access controller and compares them with $PCRs_{AR}$ and $PCRs_{AC}$ to thereby verify the measurement logs $Log_{AR}$ and $Log_{AC}$ for integrity; next compares trustworthiness measurement values of respective platform components in the measurement logs $Log_{AR}$ and $Log_{AC}$ with corresponding standard trustworthiness measurement values of the respective platform components in a database to thereby finally generate results of AIK certificate authentication and platform trustworthiness verification, $Result_{AIK-PCRs}$, of the access requester and the access controller and signs the generated results of AIK certificate authentication and platform trustworthiness verification with a private key corresponding to an identify certificate of the policy manager; and finally transmits to the access controller the results of AIK certificate authentication and platform trustworthiness verification of the access requester and the access controller $Result_{AIK-PCRs}$, and a signature of the policy manager on the results of AIK certificate authentication and platform trustworthiness verification of the access requester and the access controller $[Result_{AIK-PCRs}]_{Sig}$. The results of AIK certificate authentication and platform trustworthiness verification of the access requester and the access controller $Result_{AIK-PCRs}$ generated in the step (3.4) includes the random number $N_{AC}$ and the random number $N_S$ generated by the access controller, the AIK certificate of the access requester $Cert_{AR-AIK}$, an result of AIK certificate verification of the access requester $Re_{AR-AIK}$, the values of PCRs requested by the access controller requests $PCRs_{AR}$, a result of platform trustworthiness verification of the access requester $Re_{AR}$, remediation information of platform configuration of the access requester $Rem_{AR}$, the random number generated by the access requester $N_{AR}$, the AIK certificate of the access controller $Cert_{AC-AIK}$, a result of AIK certificate verification of the access controller $Re_{AC-AIK}$, the values of PCRs requested by the access requester $PCRs_{AC}$, a result of platform trustworthiness verification of the access controller $Re_{AC}$, remediation information of platform configuration of the access controller $Rem_{AC}$.

(3.5) Upon reception of the information transmitted from the policy manager in the step (3.4), the access controller firstly verifies whether the random number $N_{AC}$ and the random number $N_S$ generated by the access controller, the AIK certificate of the access requester $Cert_{AR-AIK}$, the values of PCRs requested the access controller $PCRs_{AR}$, the random number generated by the access requester $N_{AR}$, the AIK certificate of the access controller $Cert_{AC-AIK}$ and the values of PCRs requested by the access requester $PCRs_{AC}$ are consistent with corresponding items in the information transmitted from the access controller in the step (3.1.3); next verifies the signature $[Result_{AIK-PCRs}]$ of the policy manager for validity with a public key corresponding to the identity certificate of the policy manager; then generates a result of trusted access $Re_{Access}$ and a result of platform trustworthiness evaluation of the access requester according to the result of AIK certificate verification $Re_{AR-AIK}$ of the access requester and the result of platform trustworthiness verification $Re_{AR}$ of the access requester. Finally, the access controller transmits to the access requester the information transmitted in the step (3.4), the random number generated by the access requester $N_{AR}$, the result of trusted access $Re_{Access}$ and a signature of the access controller, with the AIK private key in the Trusted Platform Module (TPM), on the values of PCRs extracted to the Trusted Platform Module (TPM) and the random number generated by the access requester $N_{AR}$, $[N_{AR}, PCRS_{AC}]_{Sig}$. In the process of generating the result of platform trustworthiness evaluation of the access requester in the step (3.5), the access controller will repeat the step (3.1) to the step (3.6) to exchange and verify trustworthiness information again with the access requester if the access controller is not satisfied with the result or on demand of another network policy, where the process of verifying the AIK certificate for validity and an additional process of platform trustworthiness verification performed by the access requester on the access controller can be optional if necessary.

(3.6) Upon reception of the information transmitted from the access controller in the step (3.5), the access requester firstly verifies whether the random number generated by the access controller $N_S$, the AIK certificate of the access requester $Cert_{AR\text{-}AIK}$, the values of PCRs requested by the access controller $PCRs_{AR}$ and the random number generated by the access requester $N_{AR}$ are consistent with corresponding items in the information transmitted from the access requester in the step (3.2) and verifies the AIK signature of the access controller $[N_{AR}, PCRs_{AC}]_{Sig}$ for validity with a public key in the AIK certificate of the access controller; then verifies the signature of the policy manager $[Result_{AIK\text{-}PCRs}]$ for validity with the public key corresponding to the identity certificate of the policy manager; and finally generates a result of platform trustworthiness verification of the access controller according to the result of AIK certificate verification of the access controller $Re_{AC\text{-}AIK}$ and the result of platform trustworthiness verification of the access controller $Re_{AC}$. In the process of generating the result of platform trustworthiness evaluation of the access requester in the step (3.6), the access requester will repeat the step (3.2) to the step (3.6) to exchange and verify trustworthiness information again with the access controller if the access requester is not satisfied with the result or on demand of another network policy, where the process of verifying the AIK certificate for validity and an additional process of platform trustworthiness verification performed by the access controller on the access requester can be optional if necessary.

In a specific implementation of the foregoing platform trustworthiness evaluation, the measurement log corresponding to the values of the Platform Configuration Registers (PCRs) of the access requester shall be transmitted to the policy manager while being encrypted, and the remediation information of the platform configuration of the access requester generated by the policy manager shall also be transmitted to the access requester while being encrypted; and alike the measurement log corresponding to the values of the Platform Configuration Registers (PCRs) of the access controller shall be transmitted to the policy manager while being encrypted, and the remediation information of the platform configuration of the access controller generated by the policy manager shall also be transmitted to the access controller while being encrypted. Encrypted transmission techniques that can be adopted here can include symmetric and asymmetric key encryption.

(4.) The TNAC client and the TNAC server generate according to the results of the platform trustworthiness evaluation in the platform trustworthiness evaluation process and transmit corresponding recommendations respectively to the access requester and the access controller so that the access requester and the access controller control mutual access ports respectively according to the recommendations.

Particularly, the step (4) can include the following steps:

The platform policy server generates in the platform trustworthiness evaluation process and then transmits results of platform trustworthiness evaluation of the access requester and the access controller to the TNAC client and the TNAC server.

The TNAC client and the TNAC server generate according to the results of platform trustworthiness evaluation generated by the platform policy server and transmit corresponding recommendations respectively to the network access requester and the network access controller, The recommendations transmitted from the TNAC server and the TNAC client to the network access controller and the network access requester can include permission, prohibition or isolation.

The network access requester and the network access controller control ports respectively according to the respectively received recommendations to thereby perform mutual access control of the access requester and the access controller.

It shall be noted that if the recommendations received by the network access requester and the network access controller are isolation, the network access requester and the network access controller make remediation according to the remediation information of the platform configuration retrieved respectively in the platform trustworthiness evaluation process and then perform the platform trustworthiness evaluation process again. As can be seen, the invention can perform multilevel control on a controlled port to thereby improve security of overall trusted network access control.

Figure 2:
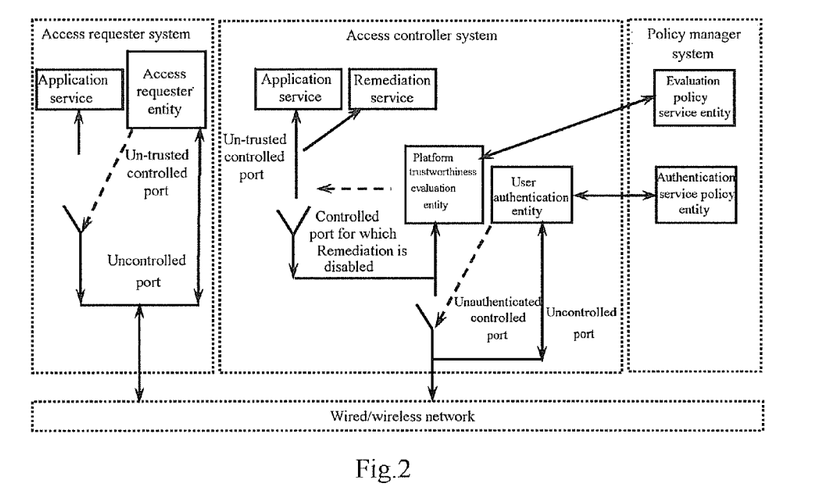
FIG. 2 is a schematic diagram of a port control system in a TNAC architecture according to the invention.

Referring to FIG. 2, port control according to the invention can be performed as follows in a practical application:

Two types of logic ports are defined for both the access requester and the access controller: uncontrolled and controlled ports. An uncontrolled port of the access requester can transport the user authentication and key negotiation protocols data, the platform trustworthiness evaluation protocol data and platform remediation service data, and a controlled port of the access requester can transport only application service data. An uncontrolled port of the access controller can transport only the user authentication and key negotiation protocols data, and a controlled port of the access controller can perform transport control of the platform trustworthiness evaluation protocol data, platform remediation service data and application service data in the form of multilevel control. The access requester and the access controller control the controlled ports according to the results of user authentication and the results of platform trustworthiness evaluation.

Referring to FIG. 2, a specific process of port control according to the invention can be performed as follows:

(a) The access requester entity in the access requester system and the user authentication entity in the access controller system perform bidirectional user authentication and key negotiation via the uncontrolled ports, and the user authentication entity in the access controller system and the authentication service policy entity in the policy manager system exchange information directly. Upon successful bidirectional user authentication, the unauthenticated controlled port in the access controller system is changed to an authenticated state so that the controlled port of the access controller can transport the platform trustworthiness evaluation protocol data.

(b) The access requester entity in the access requester system, the platform trustworthiness evaluation entity in the access controller system and the evaluation policy service entity in the policy manager system execute the tri-element peer authentication protocol to perform bidirectional platform trustworthiness evaluation between the access requester and the access controller. In the platform trustworthiness evaluation process, the access requester entity in the access requester system communicates via the uncontrolled port, the platform trustworthiness evaluation entity in the access controller system communicates via the authenticated controlled port, and the platform trustworthiness evaluation entity in the access controller system and the evaluation policy service entity in the policy manager system exchange information directly.

It shall be noted that the following four cases may occur for port control of the access requester and the access controller after the bidirectional platform trustworthiness evaluation is performed. In a first case, if both platforms of the access requester and the access controller are trusted, the un-trusted controlled ports both in the access requester system and in the access controller system are changed to a trusted state so that application service data can be transported between the access requester and the access controller. In a second case, if the platform of the access requester is trusted and the platform of the access controller is un-trusted, the states of ports in the access requester system and the access controller system are not changed, and the access controller retrieves platform remediation information from a connected isolated domain for platform remediation. In a third case, if the platform of the access requester is un-trusted and the platform of the access controller is trusted, the controlled port for which remediation is disabled in the access controller system is changed to a state in which remediation has been enabled so that the access requester can access an isolated domain via the access controller system for platform remediation. In a fourth case, if neither of the platforms of the access requester and the access controller is trusted, the controlled port for which remediation is disabled in the access controller system is changed to a state in which remediation has been enabled so that the access requester can access an isolated domain via the access controller system for platform remediation and the access controller also retrieves its platform remediation information from an isolated domain connected therewith for platform remediation.

What is claimed is:

1. A method for trusted network access control (TNAC) based upon tri-element peer authentication, comprising:
   initializing Trustworthiness Measurement Collectors, TMCs, and a Trustworthiness Measurement Verifier, TMV, at a trustworthiness measurement layer;
   executing a tri-element peer authentication protocol based on a policy manager acting as a third party by an access requester, an access controller and the policy manager at a network access control layer to perform bidirectional user authentication between the access requester and the access controller;
   when results of the user authentication indicate successful authentication or that a platform trustworthiness evaluation process is required in a local policy, executing the tri-element peer authentication protocol based on the policy manager acting as a third party by the access requester, the access controller and the policy manager at a trusted platform evaluation layer to perform bidirectional platform trustworthiness evaluation between the access requester and the access controller; and
   generating by a TNAC client of the access requester and a TNAC server of the access controller according to results of platform trustworthiness evaluation in the platform trustworthiness evaluation process and transmitting corresponding recommendations respectively to the access requester and the access controller, and performing mutual access ports control by the network access requester and the network access controller, respectively, according to the recommendations.

2. The method for trusted network access control based upon tri-element peer authentication according to claim 1, wherein port control is performed as follows:
   an uncontrolled port of the access requester controls transport of user authentication and session key negotiation protocols data, a platform trustworthiness evaluation protocol data and platform remediation service data, and a controlled port of the access requester controls transport of application service data; and
   an uncontrolled port of the access controller controls transport of the user authentication and session key negotiation protocols data, and a controlled port of the access controller controls transport of the platform trustworthiness evaluation protocol data, platform remediation service data and application service data.

3. The method for trusted network access control based upon tri-element peer authentication according to claim 2, wherein the port control is performed as follows:
   (a) an access requester entity in the access requester and a user authentication entity in the access controller perform bidirectional user authentication and session key negotiation via the uncontrolled ports, and the user authentication entity in the access controller and an authentication service policy entity in the policy manager exchange information directly; and upon successful bidirectional user authentication, the controlled port of the access controller is changed to an authenticated state to allow transport the platform trustworthiness evaluation protocol data; and
   (b) The access requester entity in the access requester, a platform trustworthiness evaluation entity in the access controller and an evaluation policy service entity in the policy manager execute the tri-element peer authentication protocol to perform bidirectional platform trustworthiness evaluation between the access requester and the access controller; and in the platform trustworthiness evaluation process, the access requester entity in the access requester communicates via the uncontrolled port, the platform trustworthiness evaluation entity in the access controller communicates via the authenticated controlled port, and the platform trustworthiness evaluation entity in the access controller and the evaluation policy service entity in the policy manager exchange information directly.

4. The method for trusted network access control based upon tri-element peer authentication according to claim 3, wherein port control of the access requester and the access controller is performed as follows after the platform trustworthiness evaluation process is performed:
   if both platforms of the access requester and the access controller are trusted, both the controlled ports of the access requester and the access controller are in a trusted state, transport of application service data is allowed between the access requester and the access controller; or
   if the platform of the access requester is trusted and the platform of the access controller is un-trusted, the uncontrolled and controlled ports of the access requester and the access controller are in an original state, and the access controller retrieves remediation information of platform configuration from a connected isolated domain for platform remediation; or
   if the platform of the access requester is un-trusted and the platform of the access controller is trusted, the controlled port for which remediation is disabled of the access controller is changed to a state in which remediation has been enabled, the access requester access an isolated domain via the access controller to retrieve remediation information of platform configuration for platform remediation; or
   if neither of the platforms of the access requester and the access controller is trusted, the controlled port for which remediation is disabled of the access controller is changed to a state in which remediation has been enabled, the access requester access an isolated domain via the access controller to retrieve remediation information of platform configuration for platform remediation.

5. The method for trusted network access control based upon tri-element peer authentication according to claim 1, wherein the recommendations comprise access permission information, access prohibition information or isolation and remediation information.

6. The method for trusted network access control based upon tri-element peer authentication according to claim 5, wherein when the recommendations received by the network access controller and the network access requester are isolation and remediation information, the access requester and the access controller make platform remediation through remediation information of platform configuration and perform the platform trustworthiness evaluation process between the access requester and the access controller.

7. The method for trusted network access control based upon tri-element peer authentication according to claim 4, wherein platform trustworthiness evaluation is performed as follows:
 platform credential authentication is performed: the policy manager verifies AIK certificates of the access requester and the access controller for validity; and
 platform trustworthiness verification is performed: the policy manager verifies platform trustworthiness of the access requester and the access controller.

8. The method for trusted network access control based upon tri-element peer authentication according to claim 7, wherein the platform trustworthiness evaluation process between the access requester and the access controller comprises:
 transmitting information identifying the platform configuration of the access requester between the access requester and the policy manager and information identifying the platform configuration of the access controller between the access controller and the policy manager through encrypted transmission;
 transmitting exchanged information between the TNAC client and the TNAC server using a session key; and
 generating and transmitting, by the policy manager, the results of platform trustworthiness evaluation of the access requester and the access controller to the TNAC client and the TNAC server.

9. The method for trusted network access control based upon tri-element peer authentication according to claim 1, wherein a user authentication process between the access requester and the access controller comprises:
 initiating an access request from the access requester to the access controller;
 initiating by the access controller the user authentication process upon reception of the access request and generating results of user authentication of the access requester and the access controller;
 generating, by the access requester and the access controller, a primary key there between them upon successful user authentication; and
 negotiating by the access requester and the access controller about a session key using the primary key and transmitting user authentication success information respectively to the TNAC client and the TNAC server.

10. The method for trusted network access control based upon tri-element peer authentication according to claim 9, wherein initializing the Trustworthiness Measurement Collectors, TMCs, and the Trustworthiness Measurement Verifier, TMV, at the trustworthiness measurement layer comprises:
 initializing, by the TNAC client of the access requester and the TNAC server of the access controller, the Trustworthiness Measurement Collectors, TMCs, at the trustworthiness measurement layer to collect trustworthiness information required for each other;
 initializing, by an Evaluation Policy Server, EPS, of the policy manager, the Trustworthiness Measurement Verifier, TMV, at the trustworthiness measurement layer to verify platform trustworthiness of the access requester and the access controller;
 storing, by Trusted Platform Modules, TPMs, of the access requester and the access controller, the trustworthiness information required for each other into Platform Configuration Registers, PCRs;
 preparing, by the TNAC client of the access requester and the TNAC server of the access controller, platform trustworthiness information required for the access controller and the access requester respectively through the Trustworthiness Measurement Collectors, TMCs; and
 establishing and distributing, by the policy manager, access control policies comprising a policy of the access requester for joining a connected network and a network access control policy of the access controller for the access requester.

11. The method for trusted network access control based upon tri-element peer authentication according to claim 2, wherein the recommendations comprise access permission information, access prohibition information or isolation and remediation information.

12. The method for trusted network access control based upon tri-element peer authentication according to claim 3, wherein the recommendations comprise access permission information, access prohibition information or isolation and remediation information.

13. The method for trusted network access control based upon tri-element peer authentication according to claim 4, wherein the recommendations comprise access permission information, access prohibition information or isolation and remediation information.

* * * * *